March 25, 1952 P. J. WALSH 2,590,740
GRAVITY METER
Filed Feb. 5, 1945 2 SHEETS—SHEET 1

INVENTOR
PHILIP J. WALSH
BY
Lippincott + Metcalf
ATTORNEYS

March 25, 1952 P. J. WALSH 2,590,740
GRAVITY METER
Filed Feb. 5, 1945 2 SHEETS—SHEET 2

INVENTOR
PHILIP J. WALSH
BY Lippincott + Metcalf
ATTORNEYS

Patented Mar. 25, 1952

2,590,740

UNITED STATES PATENT OFFICE 2,590,740

GRAVITY METER

Philip J. Walsh, San Francisco, Calif.

Application February 5, 1945, Serial No. 576,193

8 Claims. (Cl. 73—382)

My invention relates to meters, and more particularly to a meter which is sensitive to gravity.

Among the objects of my invention are:

(1) To provide a novel and improved gravity sensitive meter;

(2) To provide a novel and improved meter capable of ultra-high sensitivity to small changes in gravity;

(3) To provide a novel and improved gravity meter of simple design and high efficiency;

(4) To provide a novel and improved gravity meter which is compensated against errors due to temperature changes.

Additional objects of my invention will be brought out in the following description of preferred embodiments of my invention taken in conjunction with the accompanying drawings wherein.

Figure 1:
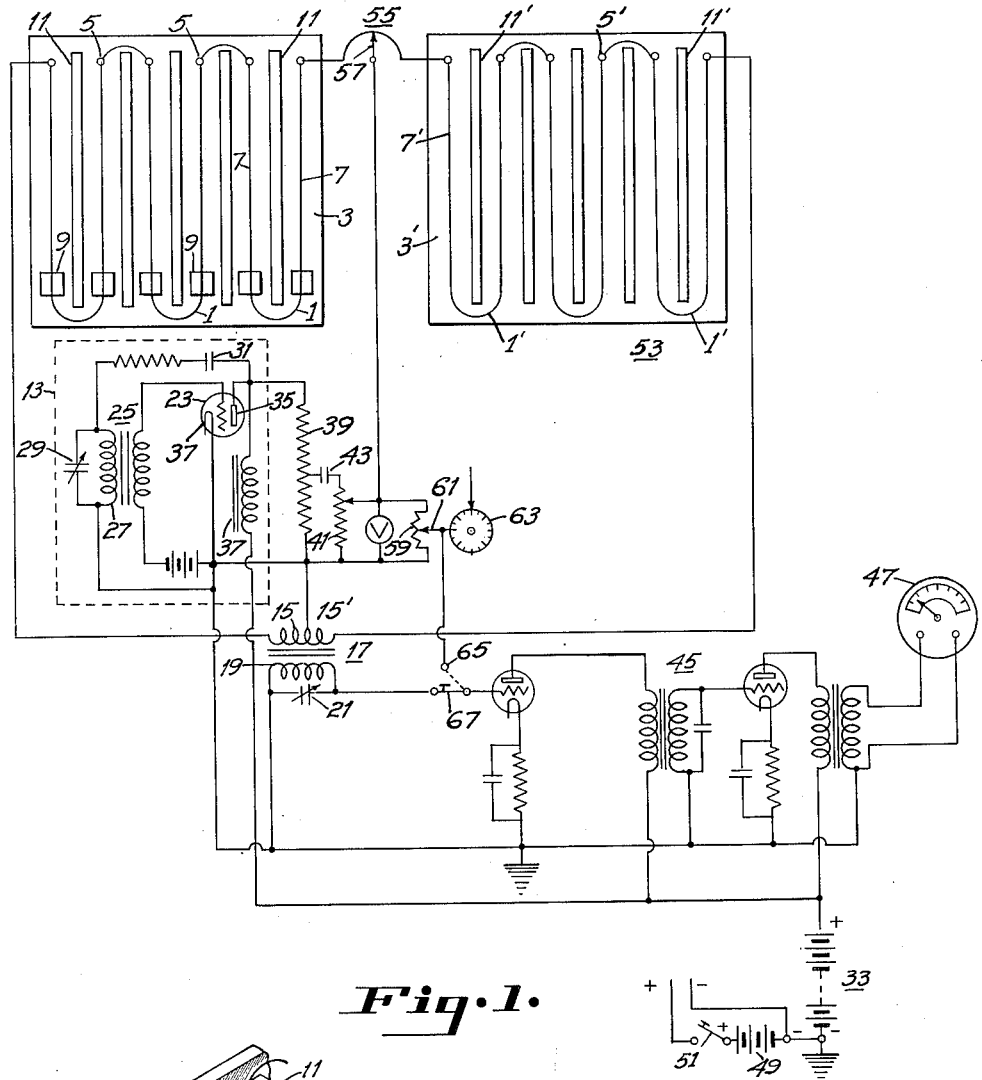
Figure 1 is a system diagram depicting a gravity sensitive meter embodying the principles of my invention.
Figure 3:
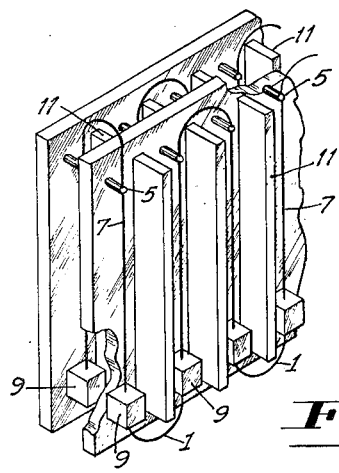
Figure 3 is a three-dimensional view depicting an assembly of elements constituting an important feature of the systems of Figures 1 and 2.

Reduced to its fundamentals, my invention contemplates the determination of gravity effects by exposing a series of weighted loops of high resistance wire to gravity, causing the pull of gravity on the weights to stretch the wire and increase its resistance, then integrating the resistances of such loops and by comparison of such integrated values of resistances with corresponding values representing different conditions, determining the gravity effect under the existing conditions.

Such changes in resistance when confined to stretching of the wire within the elastic limit of the wire material, will be proportional to any increase in pull of gravity and, therefore, becomes indicative of gravitational pull. By integrating the resistances of several such loops of wire as indicated, the sensitivity of the device becomes theoretically unlimited, such sensitivity being a function of the number of loops employed. For a more detailed description of my invention, reference will be made to the accompanying drawings.

Of primary importance in this connection are a plurality of loops 1 of high resistance wire freely suspended in spaced relationship to a back board 3 from pins 5 driven into the board. Each loop includes a pair of strands 7, adjacent the lower end of each of which is affixed a weight 9. In the event the weight is of lead, the same may be pinched thereon. A plurality of partitions 11 on the board and extending between the strands of each loop, isolate the weights from each other. A plurality of such boards may be stacked as are the plates of a storage battery, thereby forming a four-sided compartment for the free suspension of each weighted strand.

Each strand and, therefore, each loop, when hanging freely will be exposed to the full effect of gravity, and due to the presence of the weights, will be caused to stretch as the effect of gravity increases. When such stretching is confined within the elastic limits of the wire material, the stretch will be proportional to the effect of gravity and as such effect increases, the length of each strand and, therefore, the length of each loop will likewise stretch proportionally.

Inasmuch as the maximum stretch of a loop in any event, will be so slight as to be impractical of measurement with any degree of accuracy, it is an important feature of my invention to integrate the resistances of a plurality of loops, the number of which will be such as to enable a very accurately measurable change in resistance or changes in gravity which otherwise would be imperceptible.

The resistances of these loops are integrated as by connecting the loops in series electrically to render such resistances additive, and then utilizing the integrated values of resistances in determining the gravity values.

In lieu of utilizing independently formed loops and then electrically connecting the same in series, I prefer to form all of the loops from a single length of high resistance wire and spot welding these loops to their various suspension pins. In this manner, I not only preclude slippage at the points of suspension, but also eliminate the possibility of adversely affecting results through the introduction of contact voltages.

The loops thus arranged are connected across the output of an oscillator 13 through the primary winding 15 of a coupling transformer 17, the secondary 19 of which is tuned by a shunting condenser 21 to the frequency of the oscillator.

The type of oscillator to be employed is not critical. It may be of any type having reasonable frequency stability and not affected appreciably by temperature changes.

The oscillator illustrated in the drawings is one described on page 252 of "Radio Engineering" by Terman, and possesses characteristics rendering it applicable for use in my invention. This particular oscillator involves a three electrode tube 23 having its grid circuit coupled through a unity coupling transformer 25 to the plate circuit, with the plate circuit winding 27 tuned by a condenser 29 to the frequency desired. A blocking condenser 31 in the plate circuit isolates it from the direct current source 33 of plate potential which supplies potential to the plate 35 of the tube through a choke coil 37 in a conventional manner.

Alternating current energy developed by the oscillator is fed to an output circuit connected between the plate 35 of the tube and its cathode 37, such output circuit including a resistor 39 from which a suitable alternating current voltage is tapped and applied across a potentiometer 41 with a blocking condenser 43 in series therewith. Relative to this oscillator, the series arranged resistance loops are connected across this potentiometer.

With this arrangement, the amount of oscillator energy passing through the primary 15 of the coupling transformer 17 and appearing in the secondary thereof, will vary in accordance with changes in the integrated values of the resistances of the high resistance loops and will, therefore, constitute a signal indicative of the value of gravity acting upon the loops.

The tuned secondary 19 of the coupling transformer 17, is connected in the input circuit of an amplifier 45 involving one or more stages of amplification, as necessary, the output of which amplifier is in turn connected to a suitable indicating device such as a meter 47, the readings of which will accordingly be responsive to and indicative of changes in gravity.

All amplifier stages may be of conventional design and supplied from the same plate supply source 33 as the oscillator 13. The electron discharge devices in both the oscillator and amplifier may be of the heater type, in which case, all heaters may be supplied with heater energy from a common source 49 in any conventional manner, and connectable in circuit by a main switch 21.

To assure accuracy and reliability, the system should be protected against changes in ambient temperature and, consequently, it is within the contemplation of my invention to enclose the entire system as thus far described, within a heat box or oven suitably controlled as to temperature, such apparatus being well known in the art.

Moreover, I contemplate introducing into the system, a balancing circuit 53 capable of balancing out or neutralizing any resistance changes in the high resistance loops, due to variations in temperature conditions.

The balancing circuit will include a duplication of the loop arrangement previously described, but without weights. Reference numerals designating corresponding elements have been primed. This duplicate set of resistance loops is connected in parallel with the first set through a primary winding 15' corresponding to the winding 15, said winding being preferably part of the same transformer 17. From a practical viewpoint, the primary winding of the transformer 17 in this case will preferably be of the center tapped type, in which one-half of the primary will then constitute the winding 15 while the other half will constitute the corresponding winding 15' in the balancing circuit.

By exposing both sets of loops to the same ambient temperature conditions, any change in resistance of the loops of one set due to a change in temperature condition, will be balanced out in the primary of the transformer 17 by a similar change in the resistance of the loops of the other set. Therefore, any signal appearing across the secondary of the coupling transformer 17 must be attributable to the presence of the weights on the one set of loops and the absence of weights on the other set of loops, thereby introducing into the coupling transformer, a signal indicative of the gravitational pull on the weights.

When a balancing circuit is not utilized, as when the system is incorporated in a thermostatically controlled oven, the readings on the meter 47 will always vary in the direction of change of gravity, that is when the pull of gravity increases, the meter reading will increase, and when it decreases, the meter reading will fall proportionately.

When the balancing circuit is incorporated into the system, and an exact balance is realized, with the weights 9 neutralized, as by tilting the board 3 to a horizontal position, the balancing circuit neutralizes all output from the oscillator thereafter, except what is permitted through unbalance caused by gravity changes. The balancing circuit thus sets a level from which such changes are measured. It becomes apparent, then, that such level can be shifted, if desired, merely through a slight unbalance of the system. Such slight unbalance would not noticeably impair the function of the balancing circuit to neutralize resistance changes brought about by temperature conditions.

To effect either a perfect balance or a slight unbalance, as circumstances dictate, I provide a slide wire potentiometer 55 between the two sets of loops and include the slider 57 in the connection to the oscillator output.

In some installations, it may be inconvenient or undesirable to temperature compensate the amplifier 45, in which case, if the amplifier is exposed to changes in temperature conditions, the meter 47 can only be expected to give a rather close approximation of the true value it is measuring.

To check the meter 47 and to obtain accurate readings under the circumstances, I provide a potentiometer 59 in parallel with the potentiometer 41, and mount the slider 61 of this potentiometer on the shaft of a dial 63 which is accurately calibrated in terms of the same units as the meter 47. I run a connection from this slider to a contact 65 of a single pole switch 67 connected preferably in the grid lead of the first stage of the amplifier.

With this arrangement, the switch can be thrown to connect the calibrated potentiometer in the grid circuit of this amplifier stage, and at the same time disconnect the signal input transformer 17. Following this changeover, the calibrated dial 63 is rotated until the meter 47 registers the same reading as it did with the transformer 17 in the circuit. Having made this adjustment, the calibrated dial will give the true reading.

Figure 2:
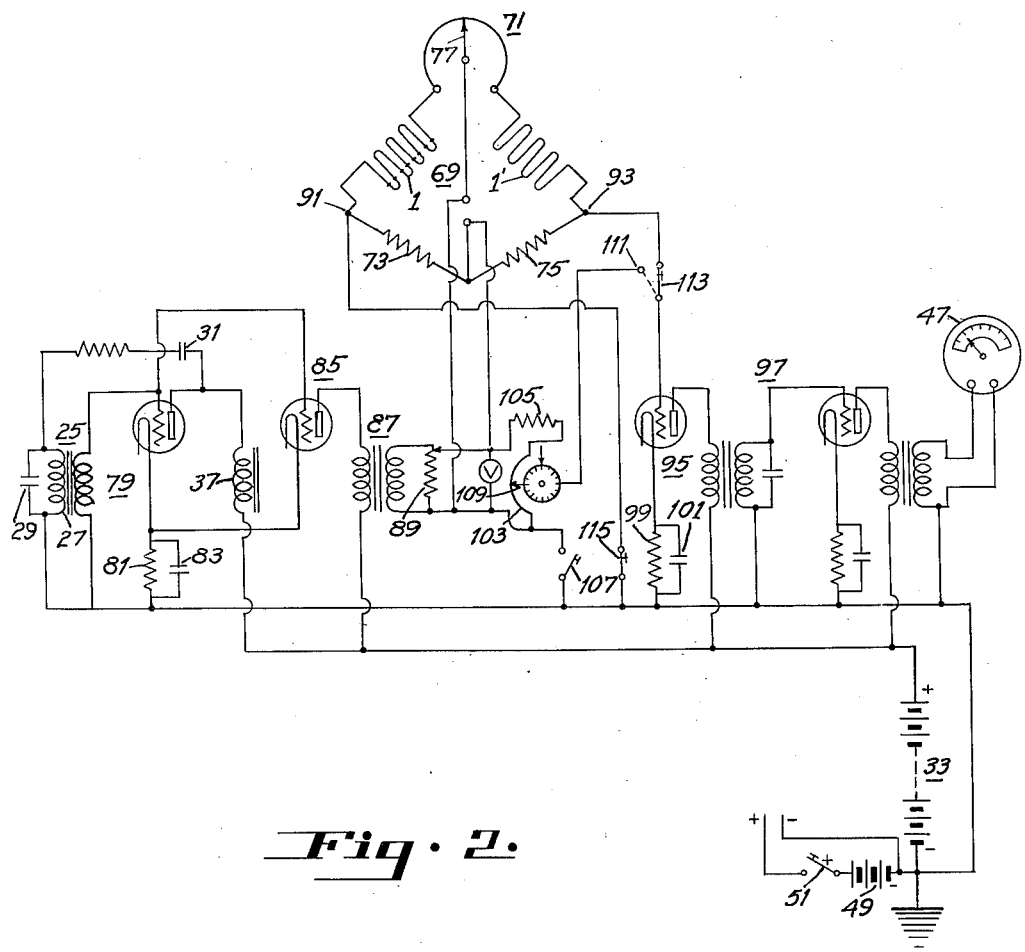
Figure 2 is a similar system diagram depicting a modified form of my gravity sensitive meter.

The system of Figure 2 differs slightly from that of Figure 1, but retains the same fundamental features characteristic of my invention. Corresponding parts, accordingly, carry the same reference numerals.

In this modified system, the set of weighted loops 1 and the set of unweighted loops 1', both shown schematically in this figure, lie in adjacent arms of a Wheatstone bridge 69, and are connected at one end by a potentiometer, preferably a slide wire potentiometer 71. The other two arms of the bridge contain resistors 73 and 75, respectively, and of like value. In one diagonal of the Wheatstone bridge, between the slider 77 of the slide wire potentiometer 71 and the junction of the resistors 73 and 75, I connect the output of an oscillator 79.

The oscillator could be the same as that of Figure 1, but is here shown as utilizing a conventional self-biasing arrangement in the form of a cathode resistor 81 shunted by a condenser 83, in lieu of the battery illustrated in the oscillator of Figure 1.

The output is taken off through an amplifier 85 whose grid and cathode are connected respectively to the grid and cathode of the oscillator 79, and whose output in turn, is passed on through a coupling transformer 87 to a potentiometer 89 shunting the secondary of this transformer.

It is this potentiometer which is preferably connected between the slider 77 of the slide wire potentiometer 71 and the junction of the two resistors 73 and 75 as previously described. This represents the input energy of the Wheatstone bridge network.

The output of the bridge network is taken off between the points 91 and 93 representing the junctions of each set of loops and its adjacent resistor, and such output is impressed across the grid and filament of the first stage 95 of a multi-stage amplifier 97, by connecting one such junction point to the grid and the other to the cathode, through a conventional self-biasing arrangement of cathode resistor 99 shunted by a condenser 101.

In the output of the amplifier, the signal is impressed upon the meter 47 in the same manner as in the circuit of Figure 1.

With the weights rendered ineffective, as by tilting the boards to a horizontal position, and the bridge then adjusted for perfect balance, which can be realized through adjustment of the slide wire potentiometer 71, no signal will be impressed across the input to the multi-stage amplifier. Like with the circuit of Figure 1, therefore, the balancing circuit sets a level from which to measure the gravity changes, and, if desired, this level can be shifted through manipulation of the slider of the potentiometer 71 to cause a slight unbalance of the system.

As in connection with the previously described system of Figure 1, means is provided for checking the accuracy of the meter 47 and determining the amount of error due to temperature variations to which the amplifier might be exposed in operation.

Such means, like in the previous circuit, may take the form of a calibrated dial-controlled slide wire potentiometer 103 connected in parallel with the oscillator output potentiometer 89, through a current limiting resistor 105, and connectable across the grid and filament of the tube in the first stage of the amplifier 97, in lieu of the Wheatstone bridge network 69.

Such change is made possible by connecting one end of the dial controlled potentiometer through a switch 107 to ground, the slider 109 of the potentiometer to a contact 111 on a single pole two-position switch 113 which is normally connected in the grid lead to the tube in the first stage of the amplifier, and by including a normally closed switch 115 in the lead from the bridge network to ground. These switches are preferably mechanically connected for simultaneous operation in such a manner, that the bridge network will be disconnected from the tube of the first stage while the dial-controlled potentiometer is connected to this tube in lieu thereof.

It is very essential in the utilization of my improved gravity meter, that the weights hang free, and to assure this, it is within the contemplation of my invention to install levels on the apparatus for indicating when such condition exists.

The meter obviously is capable of use in determining altitude, in which case the indicating meter 47 will be calibrated to read in terms of feet or miles, or the invention may be utilized, where even a higher degree of sensitivity is required, as in the location of salt domes when exploring for oil.

The location of salt domes by specific gravity methods necessitates apparatus of ultra-high sensitivity to gravity changes, and inasmuch as the sensitivity of my improved meter system is determined by the number of resistance loops employed and is, therefore, practically unlimited, it becomes apparent that my system is admirably adapted for such exploration purposes.

While I have disclosed two embodiments of my invention in its preferred form, the same is subject to variations and modifications, without departing from the underlying principles involved, and I accordingly do not desire to be limited in my protection to the specific details illustrated and described, except as may be necessitated by the appended claims.

I claim:

1. A meter sensitive to changes in gravity, comprising a plurality of electrical elements capable of passing current, independent means associated with each of said elements and responsive to changes in gravity for altering the ability of each of said elements to pass current, means series connecting said electrical elements together to obtain an integrated value of such alterations in the ability of said elements to pass current, a source of electrical energy connected to supply said series-connected elements, and indicating means connected to respond to changes in current from said source through said elements.

2. A meter sensitive to changes in gravity, comprising a plurality of electrical resistance elements, an independent tensioning means associated with each of said elements for altering the resistance of each of said elements in response to changes in gravity, a source of electrical energy connected to supply current to said elements, and means for indicating variations in said current produced by alterations in resistance of all of said elements.

3. A meter sensitive to changes in gravity, comprising a plurality of loops of electrically conductive wire, weights carried by said loops whereby within the elastic limit of said wire, a change in gravity pull on such weights produces an increment of change in the electrical resistance of each of said loops, means for integrating such resistances, and means for indicating changes in the integrated value of such resistances.

4. A meter sensitive to changes in gravity, comprising a plurality of loops of electrically conductive wire, weights carried by said loops whereby within the elastic limit of said wire, a change in gravity pull on such weights produces a minute increment of change in the electrical resistance of each of said loops, a source of electrical energy connected to supply current to said loops, means for integrating such resistances, and means responsive to changes in current in said loops produced by said changes in resistance for indicating changes in gravity.

5. A meter sensitive to changes in gravity, comprising a plurality of loops of electrically conductive wire, free weights carried solely by said loops whereby within the elastic limit of said wire, a change in gravity pull on such weights produces an increment of change in the electrical resistance of each of said loops, a source of electrical energy connected to supply current to said loops, means connecting said loops in series, and means responsive to changes in current consequent upon changes in resistance of said loops for indicating the magnitude of said resistance changes.

6. A meter sensitive to changes in gravity, comprising a plurality of independent freely suspendable loops of electrically conductive wire, weights carried by said loops whereby within the elastic limit of said wire, a change in gravity pull on such weights produces a proportional increment of change in the electrical resistance of each of said loops, means for integrating such resistances, means for indicating changes in the integrated value of such resistances, and means for temperature compensating said loops.

7. A meter sensitive to changes in gravity, comprising a plurality of loops of electrically conductive wire, weights carried by said loops whereby within the elastic limit of said wire, a change in gravity pull on such weights produces a proportional increment of change in the electrical resistance of each of said loops, a source of electrical energy connected to supply said loops in series, means exposed to ambient temperature conditions for indicating to a close approximation the changes in energy supplied to said loops from said source, and calibrated means connectable to said indicating means and said source for supplying measured proportional changes in energy from said source to said indicating means, to determine the actual value of changes of energy from said source corresponding to a previous indication of said indicating means for a given set of conditions.

8. A meter sensitive to changes in gravity, comprising a plurality of loops of electrically conductive wire connected in series, weights carried by said loops whereby within the elastic limit of said wire, a change in gravity pull on such weights produces a proportional increment of change in the electrical resistance of each of said loops, a duplicate series of loops exclusive of weights, exposed to the same temperature conditions as the weighted loops, a source of electrical energy having an output circuit including a transformer with a pair of similar primary windings and one of said series of loops in circuit with each of said primary windings, and means for indicating the output from said source.

PHILIP J. WALSH.

REFERENCES CITED

The following references are of record in the file of this patent:

UNITED STATES PATENTS

| Number | Name | Date |
| --- | --- | --- |
| 2,059,549 | Carlson | Nov. 3, 1936 |
| 2,252,464 | Kearns | Aug. 12, 1941 |
| 2,265,011 | Siegel | Dec. 2, 1941 |
| 2,304,191 | Mott-Smith | Dec. 8, 1942 |
| 2,322,319 | Ruge | June 22, 1943 |
| 2,367,126 | James | Jan. 9, 1945 |

OTHER REFERENCES

Pub. "Strain Gages," in Electronics, December, 1943, pgs. 106–111, 192, 193 and 194.